United States Patent [19]

Yamada et al.

[11] Patent Number: 5,039,213

[45] Date of Patent: Aug. 13, 1991

[54] OPTICAL EQUIPMENT WITH A SEMITRANSPARENT MIRROR

[75] Inventors: Kenji Yamada, Yachiyo; Yoichi Iki, Kawasaki, both of Japan

[73] Assignee: Nikon Corporation, Tokyo, Japan

[21] Appl. No.: 416,608

[22] Filed: Oct. 3, 1989

[30] Foreign Application Priority Data

Oct. 6, 1988 [JP] Japan .................. 63-252699

[51] Int. Cl.$^5$ ............................................. G02B 17/00
[52] U.S. Cl. ..................................... 359/629; 359/726; 359/839
[58] Field of Search ............... 350/445, 446, 447, 601, 350/602, 603, 617, 618, 174

[56] References Cited

U.S. PATENT DOCUMENTS

| 1,834,017 | 12/1931 | Carbonara | 350/447 |
| 2,314,392 | 3/1943 | Dimmick | 350/445 |
| 4,787,711 | 11/1988 | Suzuki et al. | 350/174 |
| 4,892,386 | 1/1990 | Suzuki et al. | 350/174 |

FOREIGN PATENT DOCUMENTS 61-271402  12/1961  Japan .

*Primary Examiner*—Rodney B. Bovernick
*Assistant Examiner*—J. P. Ryan
*Attorney, Agent, or Firm*—Shapiro and Shapiro

[57] ABSTRACT

In an optical system a semitransparent mirror which is disposed at a predetermined angle with respect to an optical axis and which has a semitransparent surface (for instance, a front surface) and a transparent surface (for instance, a rear surface) is so designed as to split a diverging or converging light incident thereon into a first optical path of light flux reflected from the semitransparent surface and a second light path of light flux transmitted through both the semitransparent and transparent surfaces. Furthermore, in order that the position of an image focused by the light flux reflected from the transparent surface coincides with the position of an image focused by the light flux reflected from the semitransparent surface, the transparent surface is made non-parallel with the semitransparent surface of the semitransparent mirror. The thickness of the mirror decreases or increases toward image planes depending upon whether converging light flux or diverging light flux is incident on the mirror.

6 Claims, 2 Drawing Sheets

OPTICAL EQUIPMENT WITH A SEMITRANSPARENT MIRROR

BACKGROUND OF THE INVENTION

1. Field of the Invention

The present invention relates to an optical equipment with a semitransparent mirror and more particularly an optical equipment capable of eliminating double images produced by the reflected light rays from the front and rear surfaces of a semitransparent mirror disposed at an angle in the converging light flux or diverging light flux.

2. Related Background Art

When a semitransparent mirror having a pair of parallel surfaces is disposed at an angle in converging or diverging light flux, in addition to light flux reflected from one (for instance the front surface) of parallel surfaces coated with a semitransparent film, the light flux reflected from the other, transparent, surface (for instance a rear surface) not coated with a semitransparent film produces a ghost image at a position slightly displaced from the position of a real image produced by the light flux reflected from the semitransparent surface. Because of these double images, the performance of an optical equipment is degraded as is well known to those skilled in the art.

For instance, in the case of a conventional optical equipment of the type shown in FIG. 6, the light flux emitted from an object point 1 is collected and converted into a converging flux. A semitransparent mirror 3 having a pair of parallel surfaces is disposed at an angle relative to the optical axis in the converging light flux. The converging light flux is split by the semiconductor mirror 3 into reflected and transmitted light fluxes. Four light position sensors, such as a photocell which is divided into four independent areas, are mounted on a first image plane 4 upon which is focused an image by the reflected light flux. The spot-likes focused light incident positions are optoelectrically detected. Furthermore, one or more focused spots focused on a second image plate 5 is observed through a screen disposed at the second image plate 5. In the case of the optical equipment of the type described above, main light flux 10 of the normal reflected light flux reflected from the semitransparent surface (front surface) 3a is focused at one point on the image plane 4. On the other hand, the main light ray 11 (indicated by the broken line) of the light flux which is transmitted through the semi-transparent surface 3a, reflected from the transparent surface (rear surface) 3b and then transmitted through the semitransparent surface 3a is focused on the image plane at a position displaced from the position at which is focused the main light flux 10. As a result, double images are focused over the surface of the light receiving means such as a photocell so that the distribution of light quantity incident on the light receiving means varies. Thus, an error occurs in the case of the detection of a position.

Japanese Laid-Open Patent Application No. 61-271402 discloses an optical equipment in which the front surface of a dichroic mirror which reflects illumination light flux for observation and the rear surface thereof which transmits laser light flux for detection of a position are so designed and constructed that the front and rear surface are not parallel, so that interference of the laser light flux caused by reflection from the inner surface of the dichroic mirror is prevented and consequently measurement with a high degree of accuracy may be ensured.

However, in order to displace the light rays which adversely affect the correct observation out of the field of observation, when the front and rear surfaces of a flat plate are not parallel, the shape of the light path splitting portion must be made in the form of a prism having a large wedge angle. As a result, adverse bending of the optical axis of the light path is increased and the optical performance of the optical equipment is considerably degraded. Although it is possible to reduce the thickness of a semitransparent mirror to such an extent that in practice the deviation between the double image can be neglected, but there arises the problems that when the thickness is very small, the strength of the semitransparent mirror is decreased so much that fabrication becomes difficult, and the surface smoothness is also degraded.

SUMMARY OF THE INVENTION

In view of the above, primary object of the present invention is to solve the above and other problems encountered in conventional optical equipment so that a double image can be satisfactorily eliminated, even when a light-path-splitting semitransparent mirror has a sufficient thickness from the standpoint of strength, so that a sharp optical image can be obtained.

According to the present invention, the semitransparent surface and the transparent surface of a semitransparent mirror disposed at an angle with respect to an optical axis are made non-parallel with each other so as to define a predetermined wedge shape and a predetermined included angle. The wedge-shaped semitransparent mirror is so defined that the position of a real image focused on an image plane by the light rays reflected from the transparent surface coincides with a position of a real image produced by the light rays reflected from the semitransparent surface.

More particularly, in an optical system in accordance with the present invention, a semitransparent mirror which is disposed at a predetermined angle with respect to an optical axis and which has a semitransparent surface (for instance, a front surface) and a transparent surface (for instance, a rear surface) is so designed as to split diverging or converging light incident thereof into a first optical path of light flux reflected from the semitransparent surface of the semitransparent mirror and a second light path of light flux transmitted through both the semitransparent and transparent surfaces. Furthermore, in order that the position of a real image focused by the light flux reflected from the transparent surface of the semitransparent mirror in the first optical path coincides with the position of a real image focused by the light flux reflected from the semitransparent surface, the transparent surface is made non-parallel with the semitransparent surface of the semitransparent mirror.

More particularly, the semitransparent surface and the transparent surface of the light-path-splitting mirror are made non-parallel with each other (not in parallel relationship) so that in the case of the incidence of converging light flux on the semitransparent mirror, the thickness of the mirror is decreased as the mirror approaches an image plane on which the reflected light converges and conversely, in the case of the incidence of a diverging light flux on the semitransparent mirror, the thickness increases.

As described above, the transparent and semitransparent surfaces of the semitransparent mirror are made non-parallel with each other so that two images coincide on the path of light reflected from the semitransparent mirror. As a result, for instance, in the case of photoelectric detection of the focused point in response to the distribution of quantity of light, degradation of accuracy can be prevented and a sharp image may be observed. Furthermore in the transmitted light path, coincidence of the images can be substantially attained so that not only on the reflected light path, but also on the transmitted light, photoelectric detection can be made with a high degree of accuracy and a sharp image can be observed.

The above and other objects, effects, features and advantages of the present invention will become more apparent from the following description of some preferred embodiments thereof taken in conjunction with the accompanying drawings.

DESCRIPTION OF THE PREFERRED EMBODIMENTS

The preferred embodiments of the present invention will be described in detail with reference to the accompanying drawings.

First Embodiment

Figure 1:
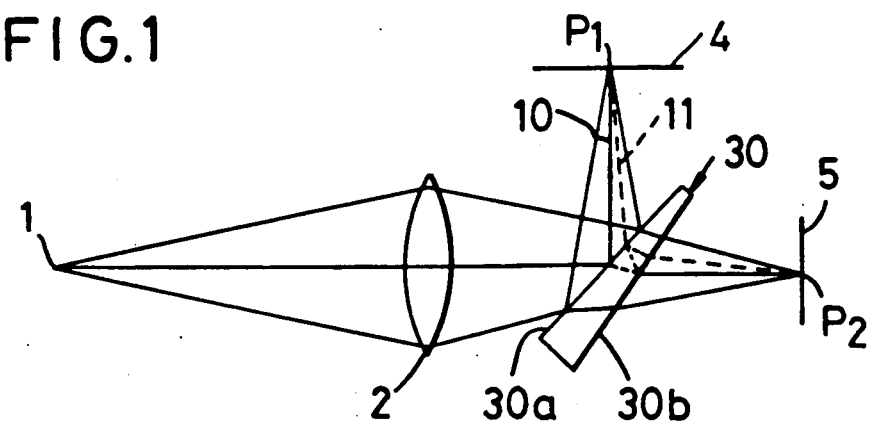
FIG. 1 shows an optical system used to explain the schematic construction of a first embodiment of the present invention and optical paths.
Figure 6:
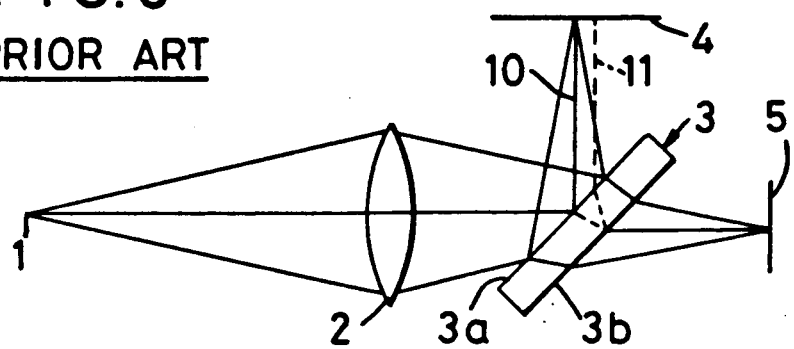
FIG. 6 illustrates a conventional optical system used to explain the construction of a conventional optical equipment and light paths.

FIG. 1 is a light path diagram illustrating the schematic construction of a first preferred embodiment of the most general optical equipment in accordance with the present invention in which a semitransparent mirror is inclined at 45° relative to the main optical axis. The first embodiment is substantially similar in construction to the optical equipment described above with reference to FIG. 6 except the shape of a semitransparent mirror. The light flux emitted from an object point is collected by an objective lens 2 and converged into converging light flux. A semitransparent mirror 30 is disposed at an angle relative to the optical axis of the objective lens 2 in the converging light flux transmitted therethrough. The light flux transmitted through the objective lens 2 is divided into a reflected light path and a transmitted light path. The same reference numerals are used to designate similar parts in FIGS. 1 and 6.

The construction of an optical system in which images coincide with each other when the semitransparent mirror 30 is inclined at 45° with respect to the optical axis of the objective lens 2 is shown in FIG. 1.

Figure 2:
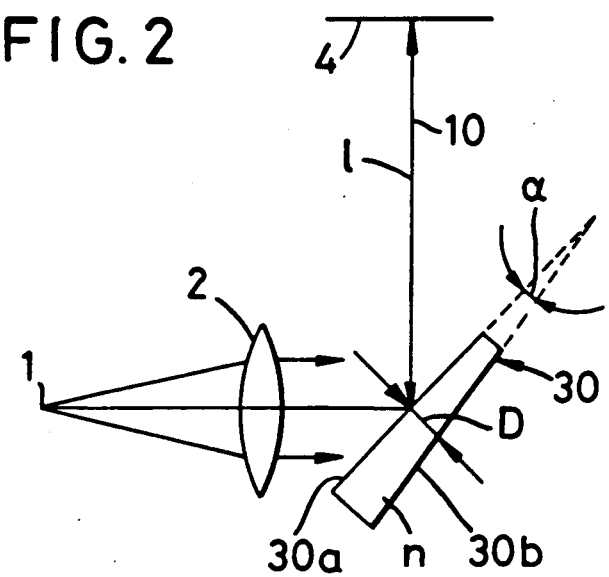
FIG. 2 is a sectional view used to explain the construction of the first embodiment.
Figure 3:
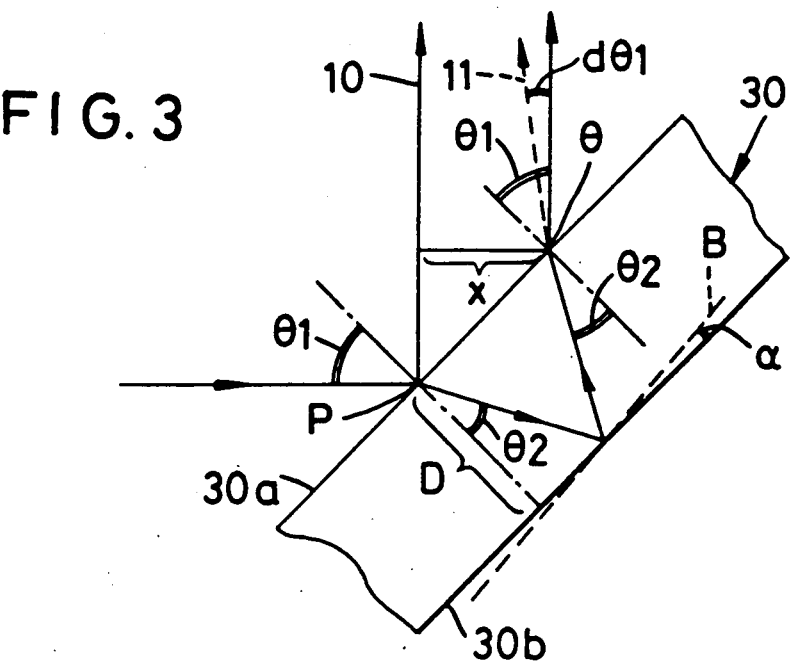
FIG. 3 is a sectional view used to explain the reflection of light on one major surface and within a semitransparent mirror.

Now, as shown in FIG. 2, it is assumed that the diverging light flux emitted from the object point 1 is collected by the objective lens 2; the converging light flux transmitted through the objective lens 2 is reflected by a semitransparent surface $30a$ coated with a semitransparent film and focused on an image plane 4; the distance between the semitransparent mirror 30 and the image plane 4 is defined as l; the thickness of the center of the semitransparent mirror 30 is represented by D; and the refractive index is indicated by n. Furthermore, as shown in FIG. 3, the angle of incidence to the semitransparent surface $30a$ is represented by $\theta_1$ and the angle of refraction, by $\theta_2$.

When it is assumed that the semitransparent surface $30a$ and the transparent surface $30b$ are parallel with each other as indicated by the solid lines, regarding the incident point P over the semitransparent surface $30a$ of the chief ray and the refraction of light at the exit point Q after the reflection from transparent surface $30b$, the following equation is obtained according to Snell's law:

$$n \sin \theta_2 = \sin \theta_1 \tag{1}$$

When the transparent surface $30b$ is slightly declined with respect to the semitransparent surface $30a$ as indicated by the broken line B, the result of the differential of Eq. (1) becomes $$n \cos \theta_2 \cdot d\theta_2 = \cos \theta_1 \cdot d\theta_1 \tag{2}$$

Next it is assumed that the semitransparent surface $30a$ and the transparent surface $30b$ of the semitransparent mirror 30 are inclined with respect to each other so that they are not parallel each other and the included angle becomes $\alpha$. Then the variation $\theta_2$ of the angle of the light ray reflected from the transparent surface $30b$ becomes twice the angle of inclination of the transparent surface $30b$. Therefore $$d\theta_2 = 2\alpha \tag{3}$$

Since the angle of incidence at the point P over the semitransparent surface 30 is 45°, the following relations can be obtained:

$$\sin \theta_2 = 1/(n\sqrt{2}) \tag{4}$$

and $$d\theta_2 = d\theta_1/(n\sqrt{2} \cos \theta_2). \tag{5}$$

In this case, the distance x between the reflected light internally reflected from the transparent surface $30b$ indicated by the broken line B and emitted through the semitransparent surface $30a$ and the normal reflected light 10 reflected from the semitransparent surface $30a$ is approximated as follows on the condition that the thickness D at the center of the semitransparent mirror 30 is considerably smaller than the distance l between the semitransparent mirror 30 and the image plane 4:

$$x = \sqrt{2} \, D \tan \theta_2 \tag{6}$$

That is, the reflected light 11 and the normal reflected light 10 are spaced apart from each other by x in the vicinity of the semitransparent surface $30a$. It follows that the condition that both the reflected light 11 and the normal reflected light 10 interest each other over the image plane which is spaced apart from the semitransparent mirror 30 by the distance l along the light path becomes $$d\theta_1 = x/l \quad (7)$$

From Eqs. (2)–(7), the included angle $\alpha$ defined by the semitransparent surface and the transparent surface of the semitransparent mirror for causing the images to coincide with each other on the image plane is given by $$\alpha = \frac{\tan\theta_2}{2n\cos\theta_2} \cdot \frac{D}{l} \quad (8)$$

That is, $$\alpha = \frac{\sqrt{2}}{4n^2 - 2} \cdot \frac{D}{l}$$

For instance, in the case of the thickness D at the center of a semitransparent mirror: D=1 mm
the distance between the transparent mirror and the image plane: l=100 mm
and the refractive index of the semitransparent mirror: n=1.5

The included angle defined by the semitransparent surface 30a and the transparent surface 30b of the semitransparent mirror is obtained from Eq. (8) as follows:

$\alpha = 0.002$ (rad); that is, about 7'.

In FIG. 1, for the sake of easy understanding of the present invention, the semitransparent mirror 30 disposed at an angle of 45° relative to the optical axis of the objective lens 2 is shown in the form of a wedge, but as described above, the included or vertical angle is a small angle ranging from a few minutes to ten minutes in practice. It follows therefore that the adverse effect on the bending of the optical axis in the optical paths of the light rays transmitted through the semitransparent mirror 30 is almost negligible.

However, as is apparent from FIG. 1, the shape of the semitransparent mirror 30 is so defined that the semitransparent surface 30a and the transparent surface 30b are made non-parrallel with each other in such a way that the thickness of the semitransparent mirror decreases toward the image planes 4 and 5 on which the convergence points p1 and p2 are located. But when the semitransparent mirror is disposed in diverging light flux, the shape of the semitransparent mirror is so defined that the thickness increases toward the image planes, as shown in FIG. 4.

Figure 4:
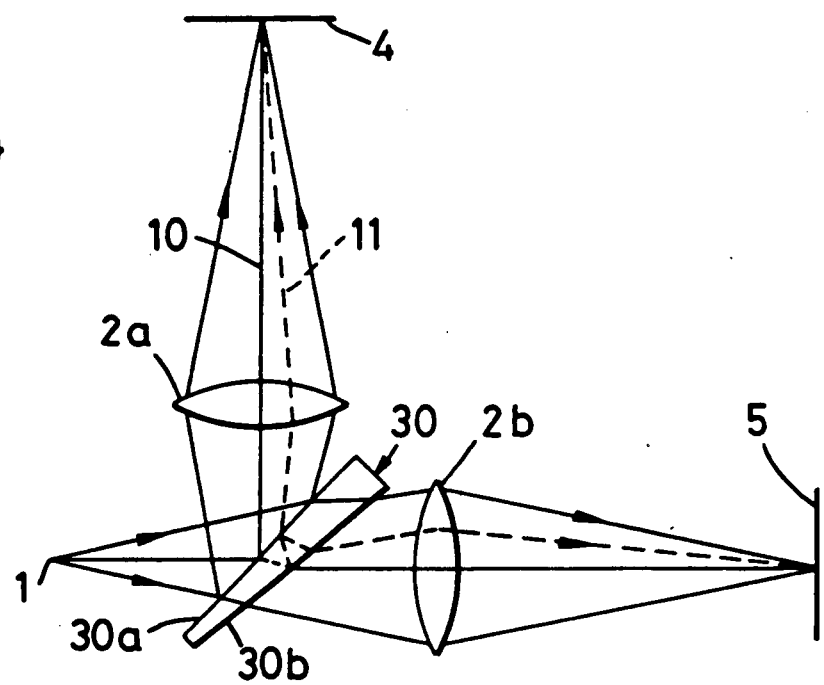
FIG. 4 illustrates an optical system used to explain the schematic construction of a second embodiment of the present invention and light paths.

FIG. 4 is a schematic light path diagram when the semitransparent mirror 30 is disposed in diverging light flux emitted from the object point 1. A first objective lens 2a is disposed in the path of the light rays reflected from the semitransparent surface 30a of the semitransparent mirror 30 so that the image of the object point 1 is focused on a first image plane 4. Furthermore a second objective lens 2b disposed in the paths of light rays transmitted through the semitransparent mirror 30 focuses the image of the object point on a second image plane 5.

In this second embodiment of the present invention, when the included angle between the semitransparent surface 30a and the transparent surface 30b of the semitransparent mirror 30 is suitably selected, two main light fluxes reflected from the semitransparent surface 30a and the transparent surface 30b can be made coincident with each other at a point on the first image plane 4; that is, the images can be made coincident with each other. From the standpoint of the law that the light ray can be inversed, the optical system as shown in FIG. 4 is substantially similar in construction to the first embodiment shown in FIG. 1. As a consequence, when the thickness at the center of the semitransparent mirror 30 is represented by D and the distance between the semitransparent mirror 30 and the object point 1, the included angle defined by the semitransparent surface and the transparent surface is obtained by Eq. (8). In this case, the thickness of the semitransparent mirror decreases toward the object point 1.

Figure 5:
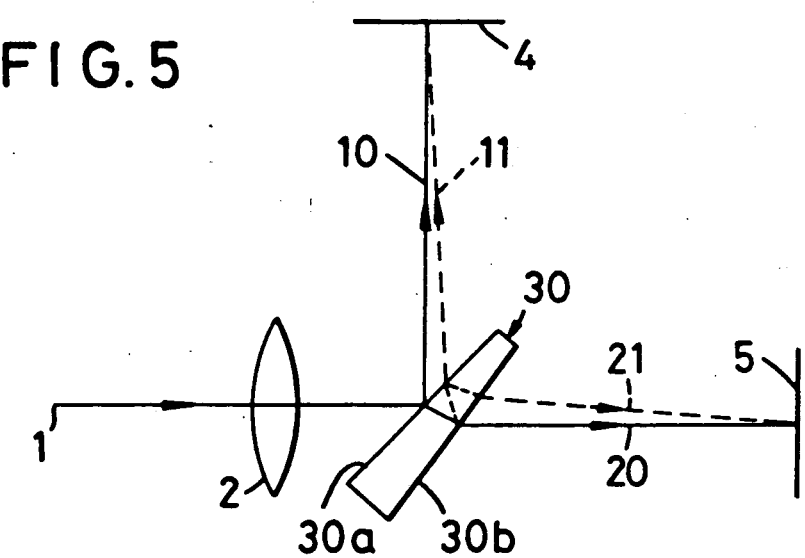
FIG. 5 illustrates the light paths of the reflected main light ray and the main transmitted light in the semitransparent mirror shown in FIG. 1.

In the second embodiment, the method for preventing a double image over the first image plane 4 produced by the light fluxes reflected by the transparent surface of the semitransparent mirror has been explained, but the method for preventing a double image over the second image plane 5 produced by the light flux transmitted through the semitransparent mirror has not been explained. In general, however, when the coincidence of images is achieved over the surface of the image plane disposed in the reflected light flux, the coincidence of images is also achieved over the surface of the second image plane disposed in the transmitted light flux. This is apparent from the schematic light path diagram shown in FIG. 5. That is, the normal transmitted light flux 20 which is transmitted through the semitransparent surface 30a and the transparent surface 30b of the semitransparent mirror 30 focuses an image over the second image plane 5 while the light flux 21, which is transmitted through the semitransparent surface 30a and reflected first from the inner surface of the transparent surface 30b and then the inner surface of the semitransparent surface 30a also, focuses an image over the second image plane 5. However, when the semitransparent surface 30a of the semitransparent mirror 30 is assumed to be a transparent surface while the transparent surface 30b is regarded as a semitransparent surface, the transmitted chief light rays 20 and 21 correspond to the reflected chief light rays 10 and 11, respectively. As a result, the coincidence of the images can be achieved in a manner substantially similar to that described above with reference to FIGS. 2 and 3.

Therefore coincidence of the image in the reflected light path and coincidence of images in the transmitted light path are achieved. Thus when photoelectric detection and observation are performed in the transmitted light path, a satisfactory image can be obtained.

Although a semitransparent mirror disposed at an angle of 45° with respect to the optical axis of an upright objective lens 2 (2b) has been described, it is to be understood that in the present invention the angle of inclination of the semitransparent mirror is not limited to 45° and that the mirror may be disposed at any suitable angle so that the reflected light path may be directed in any direction with respect to the incident light path and the same effects described again can be attained. The present invention has been described with reference to a semitransparent mirror whose front surface is semitransparent and whose rear surface is transparent, but it is apparent to those skilled in the art that the present invention may be equally applied to a semitransparent mirror whose front surface is transparent and whose rear surface is semitransparent.

As described above, according to the present invention, an inclined semitransparent mirror for splitting a light path, which has a satisfactory degree of thickness from the standpoint of mechanical strength, can positively eliminate the formation of a double image and can obtain an optical image with a high degree of sharpness. Therefore, in the case of photoelectric position detection at the focused point in response to the distribution of quantity of light in the reflected light path, degradation of accuracy can be prevented. Furthermore, in the case of the observation of an image in the reflected light path, the observation is of an image with a high degree of sharpness. Moreover not only in the reflected light path, but also in the transmitted light, a double image can be eliminated so that not only can various detections and measurements be carried out with a high degree of accuracy but also one can observe a sharp optical image.

It is of course apparent that an arbitrary detection and an arbitrary observation can be made in the reflected and transmitted light paths split by the semitransparent mirror.

What is claimed is:

1. An optical equipment comprising:
an image focusing optical means for collecting light flux from an object point and for forming a real image of the object point on an image plane; and
semitransparent mirror means disposed on an optical axis of said image focusing optical means at an angle to said optical axis and having a pair of opposed non-parallel surfaces, one of which is semitransparent and the other of which is transparent, said mirror means having a thickness between said surfaces that varies, said mirror means being disposed and constructed so that a main optical axis of light flux reflected from said transparent surface and a main optical axis of light flux reflected from said semitransparent surface converge toward and meet at a single point on said image plane at which a real image is formed by the light flux reflected from each of said surfaces.

2. An optical equipment as set forth in claim 1, wherein said semitransparent mirror means is disposed in converging light flux between said image focusing optical means and said image plane; and
said thickness decreases toward said image plane.

3. An optical equipment as set forth in claim 2, wherein said semitransparent mirror means is disposed in said converging light flux substantially at 45° with respect to the first-mentioned optical axis; and
said semitransparent mirror means satisfies the following condition:

$$\alpha = \frac{\sqrt{2}}{4n^2 - 2} \cdot \frac{D}{l}$$

where
D: the thickness of the center of said semitransparent mirror means,
n: refractive index,
l: the distance from said semitransparent mirror means to said image plane, and
α: an included angle defined between said semitransparent surface and said transparent surface.

4. An optical equipment as set forth in claim 2, wherein said semitransparent mirror means splits said light flux from said object point so that, in addition to light flux reflected from said surfaces to the first-mentioned image plane, light flux is transmitted through said mirror means to form an image of said object point at another image plane.

5. An optical equipment as set forth in claim 1, wherein said semitransparent surface and said transparent surface of said semitransparent mirror means are disposed in diverging light flux between said object point and said image focusing optical means; and
said thickness increases toward said image plane.

6. An optical equipment as set forth in claim 5, wherein said transparent mirror means splits said light flux from said object point so that, in addition to light flux reflected from said surfaces to the first-mentioned image plane, light flux is transmitted through said mirror means, and wherein said optical equipment comprises an additional image focusing optical means for collecting the transmitted light flux and forming an image of said object point at another image plane.

* * * * *